Figure 1:
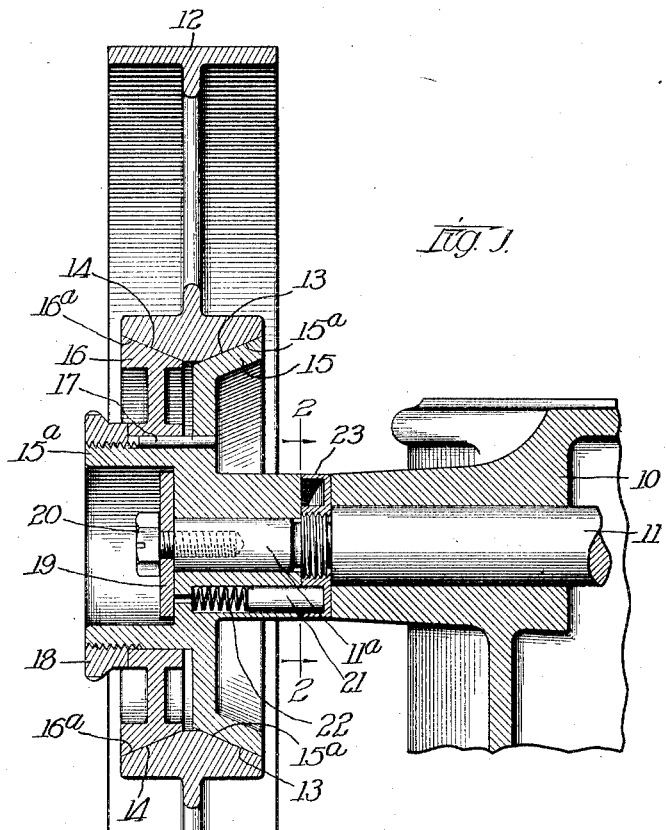

G. F. FOWLER.
FRICTION CLUTCH.
APPLICATION FILED MAR. 4, 1911.

1,009,836.

Patented Nov. 28, 1911.

Witnesses:
Robert N. Weir
N. T. Sprinkle

Inventor:
Gordon F. Fowler
by Brown & Hopkins
Attys.

UNITED STATES PATENT OFFICE.

GORDON F. FOWLER, OF OAK PARK, ILLINOIS, ASSIGNOR TO SEARS, ROEBUCK & COMPANY, OF CHICAGO, ILLINOIS, A CORPORATION OF NEW YORK.

FRICTION-CLUTCH.

1,009,836.

Specification of Letters Patent. Patented Nov. 28, 1911.

Application filed March 4, 1911. Serial No. 612,175.

*To all whom it may concern:*

Be it known that I, GORDON F. FOWLER, a citizen of the United States, residing at Oak Park, in the county of Cook and State of Illinois, have invented certain new and useful Improvements in Friction-Clutches, of which the following is a full, clear, and exact specification.

The invention relates to friction clutches and particularly to that type of friction clutches usually designated as longitudinally movable double-face, and is particularly adapted in the present invention for use in connecting driving means to the main driving or operating shaft of centrifugal separators.

The primary object of the invention is to produce a friction clutch particularly adapted for use in driving centrifugal separators and other similar machines when it is desired to operate them by power, which shall be simple and economical in construction and efficient in operation, and which shall be capable of gradually imparting momentum to high speed mechanism from a constantly operating source of power.

To attain these ends and to accomplish certain other new and useful results which will hereinafter appear, the invention consists in the novel features of construction set forth in the following specification, shown in the drawings forming part of this specification, and finally set forth with greater particularity in the subjoined claims.

Figure 2:
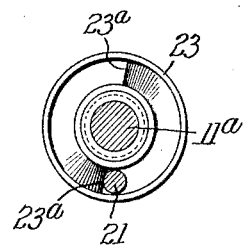

In the said drawings,—Figure 1 is a sectional view through the improved clutch; and Fig. 2 is a detail sectional view on line 2, 2 of Fig. 1.

The frame of the centrifugal separator or other machine adapted to be power driven is indicated by the reference character 10, and 11 is the driving shaft.

12 is the pulley shown in the present embodiment provided with a peripheral surface for driving belt or band, but it is obvious that power may be applied to the same in any suitable manner other than that shown. The pulley 12 is provided with double frictional faces, as indicated at 13, 14, which faces are preferably of conical form converging toward the center and toward the interior of the pulley, these frictional surfaces or faces being adapted to be supported upon and engaged by coöperating frictional surfaces on the frictional disks 15 and 16, the first of which is secured in normally fixed relation to the driving shaft 11 with respect to longitudinal movement thereon, while the latter friction disk is mounted to move longitudinally of the drive shaft 11 and hence movably mounted in relation to said driving disk 15, being slidably mounted upon the hub $15^a$, which is preferably hollow and extends beyond the outer extremity of the reduced end $11^a$ of the separator drive shaft 11, being secured against rotation in relation to the fixed disk 15 by means of the spline or key 17 fixed in disk 15 and having a portion thereof exposed above a groove in the peripheral surface of the hub portion $15^a$ and registering with the coresponding groove on the inner periphery of the friction disk 16, permitting only movement of the disk 16 longitudinally of the hub $15^a$ and of the driving shaft 11. The movable disk 16 is controlled by means of a knurled collar 18 screw-threaded on hub $15^a$. Friction disk 15 is fixed against longitudinal movement on the reduced portion $11^a$ of the shaft 11 by means of washer 19, which is secured to the end of said reduced portion of the shaft by machine screw 20, the head of the screw and washer 19 both entering the hollow hub $15^a$ of the fixed disk which is secured against rotation in relation to the shaft 11 in one direction only by means of the plunger 21 longitudinally movable in a suitable housing in the hub of the disk which is normally pressed into engagement by reason of coil spring 22 with the teeth on ratchet collar 23. This ratchet collar is secured on an enlarged threaded portion between the shaft 11 proper and the reduced portion $11^a$, which construction permits the longitudinally fixed disk 15 to rotate independently of shaft 11 in one direction, but to be in engagement therewith when rotated in the opposite direction. Ratchet disk 23 may be provided with any suitable number of ratchet teeth as indicated at $23^a$, the preferred number being two as shown.

The operation of the device is as follows. Power being applied to the pulley 12 it may freely rotate on the relatively separated disks 15, 16 when the screw-threaded collar or thumb nut 18 is adjusted to permit the disks to be separated so that their outwardly diverging surfaces do not bind the inwardly converging surfaces 13, 14 of the pulley 12. When the pulley 12 is being operated at normal speed and it is desired to begin the operation of the separator, the knurled collar or thumb nut 18$^a$ may be adjusted on the hub 15$^a$ of the disk 15 and so cause the converging surfaces of the pulley to be gripped between the frictional surfaces on the disks 15, 16 with any desired degree of pressure, thus enabling the constantly rotating pulley to have more or less of a sliding contact with the friction disks on the shaft 11 until the shaft is brought up to the proper speed. When the shaft is brought up to the proper speed, the clutch need not be further operated because less power is required to hold it at speed than to bring it up to speed. In practice it is an easy matter to shut off the power by unscrewing the knurled nut on the friction pulley because while the bowl runs at a high speed the driving shaft runs only about forty to fifty revolutions per minute and it is only necessary to grasp the knurled nut firmly and the revolution of the pulley will then unscrew it, separating the friction disks and permitting the pulley to run free from the driving shaft.

The clutch mechanism between the shaft 11 and the longitudinally fixed friction disk 15 is particularly desirable when the separator is operated by a prime mover as a gas or gasolene engine which is liable to sudden stoppage. Under such conditions the bowl of the centrifugal machine, which is normally operated at anywhere from eight to fourteen thousand revolutions per minute or even more, would be liable to injure the gearing of the machine unless provision were made for automatically disconnecting the bowl driving mechanism from the motor or the pulley 12. The clutch mechanism described permits the reduced bearing portion 21 of the shaft 11 to rotate freely within the hub of the friction disk 15 by reason of the spring-controlled plunger 21 riding over the beveled surfaces of the friction teeth 23$^a$.

In order that the invention might be fully understood the details of the preferred embodiment have been thus specifically described, but it is not desired to be limited to the exact details of construction shown, for it is apparent that to those skilled in the art the invention is capable of various embodiments without strict adherence to the details of construction herein set forth.

I claim:

1. The combination with a rotatable shaft, a friction disk secured to said shaft and rotatable therewith, means for securing the disk and the shaft together whereby the disk and shaft are locked together for rotation in one direction, but free to have relative movement in opposite directions, said friction disk having a hollow outwardly-projecting cylindrical extension, a second friction disk slidably mounted on the said hollow outwardly-projecting cylindrical extension, a friction pulley provided with frictional surfaces adapted to engage the said friction disks, and means for adjusting the last said friction disk on the hollow outwardly-projecting cylindrical extension of the first said disk.

2. The combination with a rotatable shaft, being provided with a reduced portion at its outer extremity, of a ratchet secured to the inner end of the reduced outer extremity, a friction disk journaled on the said reduced outer extremity of the shaft and being provided with a spring-controlled pawl for engagement with said ratchet whereby the said shaft and friction disk are locked against relative movement in one direction but free to move independently when moved relatively in the opposite direction, a hollow outwardly-projecting cylindrical extension on the said friction disk, a second friction disk slidably mounted on the hollow extension of the first said friction disk, means for preventing relative rotation of the said disks, a pulley provided with frictional surfaces adapted to be engaged by the frictional surfaces on the said friction disks, and means comprising an adjustable collar on the hollow outwardly-projecting cylindrical extension of the first said friction disk whereby the said friction disks may be clamped together on the friction surfaces of the said pulley.

3. The combination with a rotatable shaft, of a friction disk secured to said shaft and rotatable therewith, said friction disk having an outwardly-projecting cylindrical extension, a second friction disk slidably mounted on said outwardly-projecting cylindrical extension, a friction pulley provided with double frictional surfaces adapted to engage said friction disks, and means for adjusting the last said friction disk on the outwardly-projecting cylindrical extension of the first said disk.

4. The combination with a rotatable shaft, of a friction disk secured to said shaft by means whereby the disk and shaft are locked together for rotation in one direction, but free to have relative movement in opposite directions, said friction disk having a hollow outwardly-projecting cylindrical extension, a second friction disk slidably mounted on said outwardly-projecting cylindrical extension, a friction pulley provided with frictional surfaces adapted to engage the said friction disks, and means for adjusting the last said friction disk on the hollow outwardly-projecting cylindrical extension of the first said disk.

In testimony whereof I have signed my name to this specification, in the presence of two subscribing witnesses, on this 1st day of March A. D. 1911.

GORDON F. FOWLER.

Witnesses:
A. L. SPRINKLE,
CHAS. M. NISSEN.

Copies of this patent may be obtained for five cents each, by addressing the "Commissioner of Patents, Washington, D. C."